United States Patent [19]

Becker et al.

[11] 4,295,563

[45] Oct. 20, 1981

[54] PACKAGING SHEATH WITH CONTENTS

[75] Inventors: Reinhold Becker; Wolfgang Michel; Gerhard Hartmann, all of Wiesbaden, Fed. Rep. of Germany

[73] Assignee: Hoechst Aktiengesellschaft, Frankfurt am Main, Fed. Rep. of Germany

[21] Appl. No.: 134,313

[22] Filed: Mar. 26, 1980

[30] Foreign Application Priority Data

Mar. 30, 1979 [DE] Fed. Rep. of Germany ....... 2912720

[51] Int. Cl.³ .................... B65D 81/18; B65D 81/22; B65D 81/24; B65D 85/08
[52] U.S. Cl. ................... 206/205; 206/213.1; 206/443; 206/524.4; 206/802; 138/118.1
[58] Field of Search ............ 206/205, 213.1, 443, 206/802, 524.4; 138/118.1, 103, 109; 17/45; 426/420; 53/3; 285/72

[56] References Cited

U.S. PATENT DOCUMENTS

| | | | |
|---|---|---|---|
| 2,150,471 | 3/1939 | Van Vulpen | 285/72 |
| 2,933,866 | 4/1960 | Cranston, Jr. | 53/3 |
| 3,148,992 | 9/1964 | Hewitt . | |
| 3,886,979 | 6/1975 | Rasmussen | 138/118.1 |
| 3,971,187 | 7/1976 | McNeill | 206/802 |
| 3,981,046 | 9/1976 | Chiu | 426/420 |
| 4,007,761 | 2/1977 | Beckman | 138/103 |
| 4,013,099 | 3/1977 | Gerigk et al. | 138/109 |
| 4,026,985 | 5/1977 | Rasmussen | 138/118.1 |
| 4,033,382 | 7/1977 | Eichin | 138/118.1 |
| 4,162,557 | 7/1979 | Rasmussen | 17/45 |

FOREIGN PATENT DOCUMENTS

25095 of 1977 Australia .
32764 of 1978 Australia .
6137 of 1977 South Africa .

*Primary Examiner*—William T. Dixson, Jr.
*Attorney, Agent, or Firm*—Schwartz, Jeffery, Schwaab, Mack, Blumenthal & Koch

[57] ABSTRACT

Disclosed is an article of manufacture, comprising a hollow rod comprised of a longitudinally gathered tube of cellulose hydrate-based material, the hollow rod having a latent water content of between about 25% and 100% by weight based upon the total weight of the hollow rod and being free of chemical anti-bacteriocidal agent; a closed, substantially gas impermeable packaging sheath having a hollow interior chamber therein, with the hollow rod being positioned in the hollow interior chamber, whereby the hollow rod is completely enveloped by the packaging sheath, wherein the packaging sheath is comprised of a flexible film of material which is substantially impermeable to gases; and a protective gas essentially filling the remaining portion of the hollow interior chamber, with the gas protecting the hollow rod against the formation of aerobic microorganisms on the water-containing cellulose hydrate-based material.

11 Claims, 1 Drawing Figure

U.S. Patent     Oct. 20, 1981     4,295,563
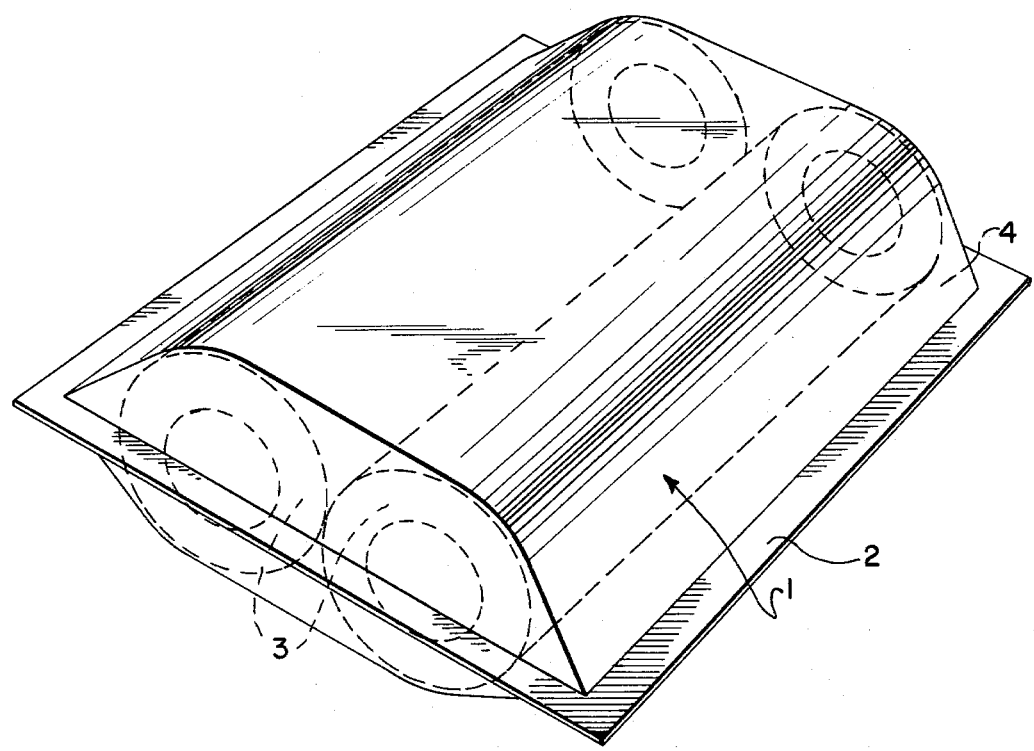

PACKAGING SHEATH WITH CONTENTS

BACKGROUND OF THE INVENTION

The present invention pertains to a functional unit including at least one hollow rod of a longitudinally gathered, flexible packaging tube based on cellulose hydrate having a latent water-content, as well as the supporting- and protective-sheath which tightly encloses the hollow rod on all sides in a practically gas impermeable manner.

Hollow rods of longitudinally gathered or shirred, flexible packaging tubes based on cellulose hydrate are employed in large quantities in connection with the preparation of various types of sausages. In accordance with the use for which they were intended, the hollow rods—closed on one end—are placed on their open end over the filling tube of a machine for filling a sausage composition. Through the filling tube, the sausage composition is then continuously pressed into the hollow interior of the hollow rod. As this takes place, the gathered tube which forms the hollow rod is continuously unfolded in accordance with the rate at which it is filled, and the entire unfolded length of the tube is filled with the sausage composition. In order to facilitate the filling process of the gathered sausage casing by providing a particular flexibility thereof, and in order to prevent damage to the sausage casing, the hollow rod is typically wetted prior to its use in the filling process. This is accomplished, for example, by placing the hollow rod for a predetermined period of time into a tank filled with water. This process involves additional work, and in addition, there exists a danger that the wetting of the hollow rod does not take place sufficiently uniformly.

SUMMARY OF THE INVENTION

It is therefore an object of the present invention to provide an improved packaging sheath containing the hollow rod of a longitudinally gathered, flexible packaging tube based on cellulose hydrate.

It is a further object of the present invention to provide such an improved packaging sheath which provides both a supporting and a protective sheath for the hollow rod.

A further object of the present invention resides in providing such an improved packaging sheath which contains at least one hollow rod having a predetermined water-content.

Still another object of the present invention is to provide an improved packaging sheath with one or more water-containing hollow rods contained therein, which combination makes it possible to dispense with the separate step of wetting the hollow rods immediately before they are subjected to the filling process during sausage preparation.

It is also an object of the present invention to provide such an improved packaging sheath with one or more water-containing hollow rods contained therein which possesses the characteristics of a sufficiently long storage life for practical purposes, practically no water loss and also no mold contamination.

In accomplishing the foregoing objects, there has been provided in accordance with the present invention an article of manufacture, comprising a hollow rod comprised of a longitudinal gathered tube of cellulose hydrate-based material, the hollow rod having a latent water content of between about 25% and 100% by weight based upon the total weight of the hollow rod and being free of chemical antibacteriocidal agents; a closed, substantially gas impermeable packaging sheath having a hollow interior chamber therein, the hollow rod being positioned in the hollow interior chamber, whereby the hollow rod is completely enveloped by the packaging sheath, the packaging sheath being comprised of a flexible film of material which is substantially impermeable to gases; and a protective gas essentially filling the remaining portion of the hollow interior chamber, the gas protecting the hollow rod against the formation of aerobic microorganisms on the water-containing cellulose hydrate-based material of the hollow rod.

Further objects, features and advantages of the present invention will become apparent to a person of ordinary skill in the art from the following detailed description of preferred embodiments, when considered together with the attached FIGURE of drawing.

BRIEF DESCRIPTION OF THE DRAWING

The FIGURE of drawing is a schematic, perspective view illustrating the packaging sheath and its contents according to the invention.

DETAILED DESCRIPTION OF PREFERRED EMBODIMENTS

A hollow cylindrical rod produced by the longitudinal gathering of a flexible tube, preferably a fiber-reinforced tube, based on cellulose hydrate shall be referred to hereinafter simply as a hollow rod. The cellulose hydrate tube forming the hollow rod of the functional unit according to the present invention is free of chemical compounds having an antibacteriocidal effect.

The packaging container which forms a gas-tight envelope around all sides of the hollow rod is manufactured of a flexible sheet or film and preferably has the shape of a tubular sheath. The container functions as a supporting sheath for form-fixing of the moisture-containing hollow rod during its storage up until the time of its use according to its intended purpose. At the same time, the container serves as a protective sheath having a blocking action with respect to the entrance of gases and water or aqueous liquids which is sufficient for the practical use of the functional units of the invention as discussed above.

In a preferred embodiment, the hollow rod includes one or more chemical plasticizers. In a particularly preferred embodiment, the hollow rod contains glycerin as the chemical plasticizer, for example, in an amount within the range of from about 15 to 25% by weight based upon its total weight.

In accordance with another preferred embodiment of the invention, the functional unit is comprised of the packaging container or sheath containing therein at least two hollow rods.

The packaging container which is formed as a supporting- and protective-sheath and which envelopes the hollow rod on all sides in a gas- and liquid-tight fashion is comprised of a flexible film or sheet which is formed of a plurality of layers, wherein at least one surface layer thereof is formed of a sealable synthetic resinous material. Suitable multiple-layered film or sheet laminates for manufacture of the packaging container according to the invention include the following exemplary and preferred materials:

1. A two-layered film laminate in which one layer is comprised of polyamide-6 and has a thickness of approximately 40 μm and in which the other layer is comprised of polyethylene of low or medium density and has a thickness in the range of from about 75 to 100 μm.

2. A three-layered film laminate, in which one outer layer is comprised of a biaxially stretch-oriented polyester film, for example, a film comprised of polyethyleneterephthalate, having a thickness of about 12 μm, and the other surface layer is comprised of a layer of polyethylene of low or medium density which has a thickness in the range of from about 75 to 100 μm. Between these two above-described layers there is arranged a third layer of a polyvinylidenechloride copolymer having a predominant proportion of vinylidenechloride, wherein this layer has a thickness of about 3 μm.

3. A three-layered laminate in which one surface-layer is comprised of polyethylene of low or medium density having a thickness in the range of from about 75 to 100 μm, the other outer surface layer is comprised of a biaxially stretch-oriented polyester film, for example, comprised of polyethylenetherephthalate, which has a thickness of approximately 12 μm, and an intermediate third layer comprised of aluminum having a thickness of about 12 μm.

The packaging container which sealingly envelopes the hollow rod on all sides is practically impermeable to gases such as nitrogen, oxygen as well as carbon dioxide and water vapor, as a result of its compositional and structural construction. The sheath is likewise impermeable to water. The packaging container is considered to be practically impermeable to gases if the laminated film forming the container is characterized by the following permeation data:

Permeability for nitrogen: $<20$ $cm^3/m^2 0.24$ h.bar; measured at 20° C. and 43% relative humidity (according to DIN 53 380)

oxygen: $<20$ $cm^3/m^2 0.24$ h.bar; measured at 20° C. and 43% relative humidity (according to DIN 53 380)

carbon dioxide: $<60$ $cm^3/m^2 0.24$ h.bar; measured at 20° C. and 43% relative humidity (according to DIN 53 380)

water vapor: Maximum 1 $g/m^2/24$ h; measured at 20° C. and 85% relative humidity (according to DIN 53 122)

In the sense of the effect sought after in accordance with the present invention, the functional unit possesses a sufficiently long storage capacity for practical purposes, as a result of the above-specified permeation criteria of the protective sheath which surrounds it.

The packaging container which is comprised of a gas-tight film laminate and which is formed as a supporting-and -protective sheath preferably has a shape which is accommodated to that of the hollow rod. The portion of the hollow spaced inside of the container which is not filled by the hollow rod is designated, for definitional purposes, as the container free spaced. This free space is practically completely filled with a protective gas.

It is essential for the packaging container that its inner diameter be larger than the outer diameter of the hollow rod and that the inside space of the container be longer than the hollow rod. The respective measurements are therefor selected so that the packaging container, on the one hand, is capable of acting in a position as well as form-stabilizing manner upon the hollow rod contained in its interior, and on the other hand, is capable of providing a free space for protective gas which is sufficient to achieve the effect sought after in accordance with the invention.

Under the designation of protective gas are to be understood those gases which prevent the growth of aerobic microorganisms on the water-containing cellulose hydrate tubes. The term "protective gas" includes as preferred embodiments carbon dioxide as well as mixtures of carbon dioxide and nitrogen having a proportion of at least 20% by volume of carbon dioxide in the mixture.

The longitudinal gathered, preferably fiber-reinforced tubing based on cellulose hydrate which forms the hollow rod in the interior of the container possesses a latent water content which is sufficiently high for the intended use of the hollow rod directly after its removal from the container. A latent water content of the hollow rod which is sufficient for further processing of the hollow rod is to be understood as such a water content based in weight percentile on the total weight of the hollow rod which assures the usability of the hollow rod directly after its removal from the container for the intended purpose, e.g., filling on a sausage filling machine. The latent water content of the cellulose hydrate-based tube, preferably fiber-reinforced, which forms the hollow rod lies within the range of from about 25 to 100% by weight, preferably within the range of from about 30–50% by weight, and most preferably, the tube has a latent water content of about 35% by weight, all percentages based upon the total weight of the tube.

Reference to the intended use of the hollow rod after its removal from the packaging container is to be understood as referring to the continuous filling with a sausage composition of the tubing which forms the hollow rod, with corresponding unfolding of the tubing and filling thereof according to the amount of the sausage composition compressed into it. Direct usability of the hollow rod after its removal from the container is achieved if the hollow rod has a water-content which makes it unnecessary to subject the hollow rod to a wetting procedure after removal of the hollow rod from the packaging container and prior to its use. Such a wetting procedure should not even be necessary in order to bring the water-content of the hollow rod up to even its optimum level as determined by the subsequent processing conditions to which the hollow rod is to be subjected.

The practically gas-impermeable container assures that the latent water content of the hollow rod in the container interior, which is adapted for the further processing of the hollow rod, is maintained during the storage duration of the functional unit according to the invention. It also assures that practically no gas-exchange between the container free space and the container environment takes place during the storage duration of the functional unit. The manufacture of the subject matter of the present invention will now be explained in more detail with reference to an example of a hollow rod which is enveloped on all sides by a hollow cylindrical packaging sheath comprised of a flexible laminated film.

From a correspondingly sized section of film, a tube is formed by overlapping the edges to form a seam. A preferred laminated film is, for example, a two-layered film laminate, one layer of which is comprised of polyamide-6 having a thickness of approximately 40 μm, whereas the other layer is comprised of low density polyethylene having a thickness of 90 μm. The overlapped edges of the thus-formed tube are sealed together. Subsequently, one end of the tube is closed by sealing it also.

In the hollow interior space of the tube-shaped container of laminated foil, which is closed on one end, there is arranged a hollow rod comprised of a longitudinal gathered, fiber-reinforced tube of cellulose hydrate, which has a latent water content of, for example, 35% by weight based upon the total weight of the hollow rod. The hollow rod is shorter than the tube-shaped packaging container. The hollow interior space of the tube-shaped packaging container has, for example, a length of 33 cm and an inside diameter of 6.3 cm. The hollow rod arranged in the interior of the container has, for example, a length of 32 cm and an outer diameter of 6 cm.

In order to displace the air in the free interior space of the packaging sheath and to fill the space with a protective gas, the free space is flushed out with such a protective gas, for example, with carbon dioxide, and then, directly following the flushing-out procedure with the protective gas, the tube-shaped packaging sheath is also closed at its other end by sealing.

With reference now to the FIGURE of drawing, the functional unit in its entirety is designated by the reference numeral 1. The tube-shaped packaging sheath 2 contains in its hollow interior space the hollow rod 3 which is formed from a longitudinally gathered, fiber-reinforced tube of cellulose hydrate. A protective gas is contained in the free space 4 of the packaging sheath 2. The FIGURE of drawing is intended to merely schematically illustrate the subject matter of the present invention.

The tube-shaped packaging sheath illustrated in the drawing is one which is readily manufacturable by congruently arranging one above the other two equivalently dimensioned, rectangular sections of foil and thereafter welding together the two foil sheets in the region of two opposite side edges which run parallel to one another, in order to form a tube open at both ends.

What is claimed is:

1. An article of manufacture, comprising: a hollow rod comprised of a longitudinally gathered tube of cellulose hydrate-based material, said hollow rod having a latent water content of between about 25% and 100% by weight based upon the total weight of the hollow rod and being free of chemical anti-bacteriocidal agents;

a closed, substantially gas impermeable packaging sheath having a hollow interior chamber therein, said hollow rod being positioned in said hollow interior chamber, whereby the hollow rod is completely enveloped by said packaging sheath, said packaging sheath being comprised of a flexible film of material which is substantially impermeable to gases; and a protective gas essentially filling the remaining portion of said hollow interior chamber, said gas protecting said hollow rod against the formation of aerobic microorganisms on said water-containing cellulose hydrate-based material of said hollow rod.

2. An article as defined by claim 1, wherein said hollow rod has a latent water content of from about 30% to 50% by weight based upon the total weight of the hollow rod.

3. An article as defined by claim 1, wherein said hollow rod has a latent water content of about 35% by weight based upon the total weight of the hollow rod.

4. An article as defined by claim 1, wherein said protective gas comprises carbon dioxide or a mixture of carbon dioxide and nitrogen containing at least 20% by volume of carbon dioxide.

5. An article as defined by claim 4, wherein said protective gas comprises carbon dioxide.

6. An article as defined by claim 1, wherein said packaging sheath tightly envelopes said hollow rod so that the packaging sheath imparts form-stability to said hollow rod.

7. An article as defined by claim 1, further comprising a second one of said hollow rods positioned in said hollow interior chamber.

8. An article as defined by claim 1, wherein said flexible film of material forming said packaging sheath has the following characteristics:

Permeability for nitrogen: $<20$ $cm^3/m^20.24$ h.bar; measured at 20° C. and 43% relative humidity (according to DIN 53 380)

oxygen: $<20$ $cm^3/m^20.24$ h.bar; measured at 20° C. and 43% relative humidity (according to DIN 53 380)

carbon dioxide: $<60$ $cm^3/m^20.24$ h.bar; measured at 20° C. and 43% relative humidity (according to DIN 53 380)

water vapor: Maximum 1 $g/m^2/24$ h; measured at 20° C. and 85% relative humidity (according to DIN 53 122)

9. An article as defined by claim 8, wherein said flexible film of material forming said packaging sheath comprises:

(a) a two-layered laminate comprised of a first layer of a polyamide and a second layer of polyethylene, or (b) a three-layer laminate comprised of a first outer layer comprised of a biaxially-stretch oriented polyester, a second outer layer comprised of polyethylene and an intermediate layer comprised of (1) a polyvinylidenechloride copolymer and (2) aluminum foil.

10. An article as defined by claim 9, wherein said flexible film of material forming said packaging sheath comprises a two layer laminate having a first layer comprised of polyamide-6 having a thickness of about 40 μm and a second layer comprised of low density polyethylene having a thickness of about 90 μm.

11. An article as defined by claim 1, wherein said gathered tube comprises a fiber-reinforced tube of cellulose hydrate-base material.

* * * * *